United States Patent
Grote

[15] 3,678,662
[45] July 25, 1972

[54] FILTER FOR MOISTURE AND OIL VAPOR

[72] Inventor: George A. Grote, Glen Rock, Pa.

[73] Assignee: National Bank and Trust Company of Central Pennsylvania, Administrator, d.b.n.c.t.a. of the Estate of Willard C. Beach, deceased, and Administrator c.t.a. of the Estate of Mary B. Beach, Hanover, Pa.

[22] Filed: May 14, 1970

[21] Appl. No.: 37,125

[52] U.S. Cl..................................55/387, 55/485, 55/486, 55/502, 55/515
[51] Int. Cl.........................................B01d 53/14
[58] Field of Search.................55/512–519, 502, 55/485–489, 387–388; 210/484

[56] References Cited

UNITED STATES PATENTS

| | | | |
|---|---|---|---|
| 2,093,877 | 9/1937 | Von Pentz | 210/484 |
| 1,380,907 | 6/1921 | Hoover | 55/382 X |
| 2,630,190 | 3/1953 | Cordray | 55/381 |
| 3,186,148 | 6/1965 | Merrill et al. | 55/387 |
| 2,214,925 | 9/1940 | Guthrie | 55/387 |
| 2,852,095 | 9/1958 | De Coriolis et al. | 55/513 X |
| 1,791,229 | 2/1931 | Stampe | 55/515 X |
| 2,557,279 | 6/1951 | Greenberg | 55/515 |
| 3,388,536 | 6/1968 | Nash | 55/513 X |
| 1,892,982 | 1/1933 | Gartha | 55/512 X |
| 2,922,488 | 1/1960 | Gruner | 55/316 |
| 2,798,718 | 7/1957 | Gross | 55/485 X |
| 2,400,719 | 5/1946 | Stackhouse | 55/519 X |
| 1,560,790 | 10/1925 | Jordahl | 55/515 X |

Primary Examiner—Frank W. Lutter
Assistant Examiner—Vincent Gifford
Attorney—C. Hercus Just

[57] ABSTRACT

A filter system to absorb and separate water and oil vapors from gases comprising a cylindrical container connectable in a supply line for said gases and containing at least one filter unit comprising a seamless cylindrical sleeve formed from textile material having a predetermined uniform porosity, the diameter of said sleeve being slightly greater than the inner diameter of said container so that when the filter unit is supported between porous supporting means within said sleeve the periphery of the sleeve will smoothly and tightly engage the inner surface of the container and thereby prevent channeling and bypassing of gases between the sleeve and the inner surface of the container during use.

3 Claims, 7 Drawing Figures

Patented July 25, 1972
3,678,662
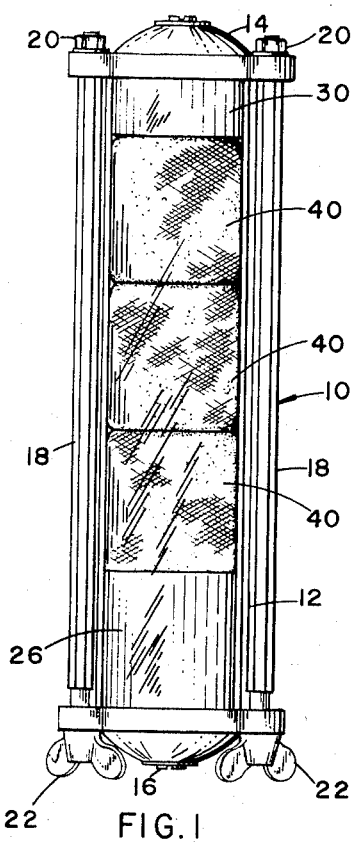
FIG. 1
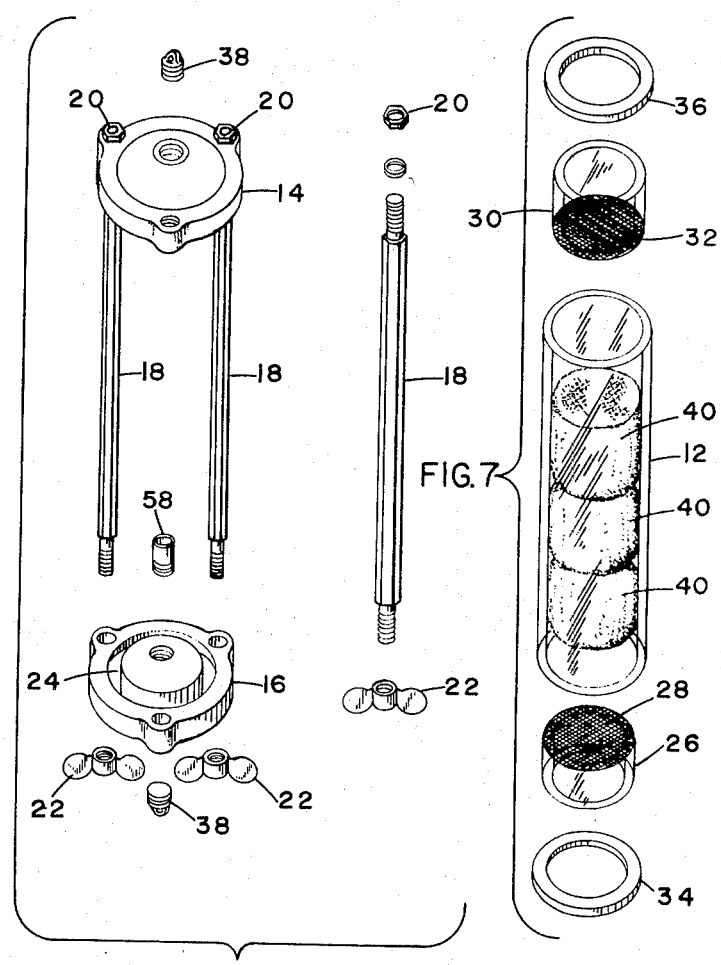
FIG. 6
FIG. 7
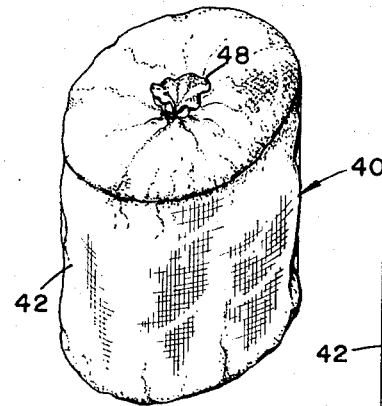
FIG. 2
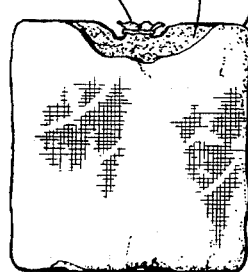
FIG. 3
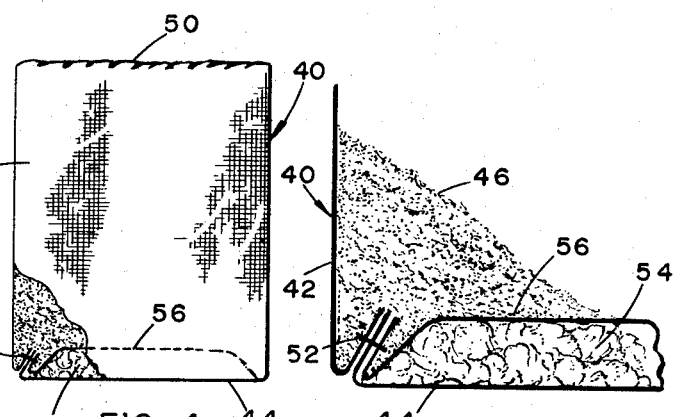
FIG. 4
FIG. 5
INVENTOR
GEORGE A. GROTE
BY
ATTORNEY

FILTER FOR MOISTURE AND OIL VAPOR

BACKGROUND OF THE INVENTION

Filter systems including supporting sleeves and the like which contain filter units formed from textile material enclosing filter material have been known heretofore and are presently in use. Said units, however, have included side members formed from pieces of textile material of predetermined size and opposite parallel edges thereof are stitched to form a seam which extends inwardly and thereby form a sleeve configuration comprising the sides of the unit. Appropriate porous end members are secured to the portion which forms the sides of the unit. Such arrangement, however, particularly along the seam referred to, inherently forms a channel of limited cross-section but nevertheless capable of permitting channeling or bypassing of unfiltered gases past the filter unit so that less than 100 percent filtering of gases can occur.

Particularly in situations where it is absolutely essential to filter from certain gases all entrained water and oil vapor, for example, such channeling or bypassing of unfiltered gases through said channel formed by said seam cannot be tolerated.

Several typical examples of filters presently available are found in prior U.S. Pat. No. 2,922,488, in the name of Gruner, dated Jan. 26, 1960, and U.S. Pat. No. 3,186,148, in the name of Merrill et al., dated June 1, 1965. The first of these patents discloses a combination of an inner screen container covered by multi-layers of cheesecloth within a metal housing, while the second patent illustrates a filter pack which is illustrated as being formed from porous material comprising an enclosure for filtering material including diatomaceous or fuller's earth. Neither of these patents disclose specific structure of the containers for the cartridges or packs which are contained within a sleeve-like housing. In the absence of such specific description and particularly since, to the best of applicant's knowledge, only seam-type textile containers have been used to form filter packs and the like in filter systems of the type represented by said patents, it is assumed that the packs shown in these patents are of the seamed type which would permit channeling and bypassing of limited quantities of gas through the channels formed by said seams inherently in the region where they engage the inner walls of the housings or casings for the filter packs.

SUMMARY OF THE INVENTION

It is the principal object of the present invention to provide in a preferably cylindrical container at least one filter unit formed from a seamless cylindrical sleeve of textile material having a predetermined uniform porosity throughout, said seamless sleeve having a diameter only very slightly greater than the inner diameter of the cylindrical container within which it is mounted, the opposite ends of said filter unit being engaged by supporting means which force the seamless sleeve into smooth, circumferentially continuous contact with the inner walls of the container so that there is no possibility of any leakage, channeling or bypassing of gases between said seamless cylindrical sleeve of the unit which forms the side walls thereof and the inner surface of the supporting container.

It is another object of the invention to provide such a filter unit as referred above, which contains preferably pulverulent type absorbing material such as diatomaceous earth, fuller's earth, and the like, said filtering material being contained within the filter unit by means of a disc-like end member formed from material similar to that from which said sleeve is formed, said disc-like end member being stitched at its periphery to one end of said sleeve, the raw ends of said connected members extending inwardly in the preferred construction and the opposite end of said unit either comprising another disc which is similar to said first-mentioned disc and connected to the opposite end of said sleeve by similar means or said opposite end of said sleeve may be of sufficient length that a portion of it may be contracted toward the axis of the sleeve and tightly tied to form a suitable enclosure for the entire mass of pulverulent material within the unit.

A further object of the invention is to form said sleeve of said unit from synthetic resin filamints, such as Nylon, or other appropriate filaments which preferably are substantially completely inert to reaction with contaminants normally found in air which requires filtering by being passed through a filter, especially to remove water and oil vapors therefrom.

A still further object of the invention ancillary to the foregoing object is to form such textile fabric from thermoplastic synthetic resin filaments, whereby suitable fusing may be used in localities on the unit such as the contracted end which is tightly tied to form a complete closure for said end of the unit.

Details of the foregoing objects and the invention, as well as other objects thereof, are set forth in the following specification and illustrated in the accompanying drawing comprising a part thereof.

DESCRIPTION OF THE DRAWING

FIG. 1 is a side elevation of an exemplary filter system embodying the principles of the present invention.

FIG. 2 is a perspective view of one embodiment of filter unit of the type included in the filter system of FIG. 1.

FIG. 3 is a side elevation of the filter unit shown in FIG. 2, part of the upper portion thereof being broken away to show certain details thereof.

FIG. 4 is a side elevation of a further embodiment of filter unit of the type used in the filter system of FIG. 1, part of one corner of said view being broken away to illustrate certain details of construction therein.

FIG. 5 is a fragmentary enlarged view of one corner of filter unit shown in FIG. 4 to illustrate further details of said construction.

FIG. 6 is an exploded perspective view of the supporting structure for the filter means of the filter system shown in FIG. 1.

FIG. 7 is an exploded perspective view of the filter elements and enclosing means therefor of the type employed in the filter system of FIG. 1.

DESCRIPTION OF THE PREFERRED EMBODIMENTS

The filter system 10 illustrated in exemplary manner in FIG. 1 is the type which is used to insure and guarantee the absorption and resulting separation of 100 percent of water and oil vapor from gases which are passed therethrough at desired speeds. Gases and especially air of the type which are suitable to be filtered by the system comprising the present invention are those which are utilized in food processing, for example. Air provides an ideal method for agitating materials under process or for moving dried bulk materials, such as flour, sugar, cereals, etc. Highly pure air is required to blend whiskey through agitation and under such circumstances, the slightest odor or taste with which said air might be contaminated cannot be tolerated.

Many chemical processes require absolutely pure air or at least air which is free from water and/or oil vapors. Completely dry and pure air, for example, is used to move and/or mix paint pigments, talc, and many other types of bulk materials where the presence of water vapor would cause clogging or a chemical reaction as in regard to moving Portland cement. In certain types of delicate instruments such as fluidic amplifiers and control circuits, air is used which must be absolutely free from contaminating materials such as water and oil vapors. A substantial number of other uses exists which require, in particular, air or similar gases which are absolutely free from moisture or oil vapors and it is in regard to filtering air to provide the desired kind in such foregoing operations that the present invention finds its principal use.

The filter system illustrated in the drawing and particularly in FIG. 1 comprises a preferably transparent cylindrical sleeve 12 which is best shown in FIG. 7. Said sleeve may be made from appropriate synthetic resin or glass and the wall thickness of such sleeve is selected to render the same capable of withstanding within safe limits the pressure intended to be exerted upon the gases being filtered by the system. The system 10 also is provided with a pair of end or cap members 14 and 16 which are similarly apertured to receive the opposite ends of tie bars 18, the opposite ends of which are threaded to receive connecting nut 20 at one end and, preferably, wing nuts 22 at the opposite ends. The cap members 14 and 16 also preferably are provided with annular recesses 24 which comprise seats for the opposite ends of the sleeve 12.

Referring particularly to FIG. 7 but also to FIG. 1, it will be seen that in the lower portion of the sleeve 12, a lower supporting member 26 is mounted which preferably is cylindrical and the upper end thereof is covered with a supporting disc 28 of metal gauze of appropriate porosity to readily pass gas therethrough without obstruction. The outer diameter of the supporting member 26 preferably closely fits within the inner diameter of the sleeve 12. Similarly, an upper supporting member 30 is provided which also closely fits within the upper end of sleeve 12 and the same also has a supporting disc 32 of metal gauze. The metal gauze discs 28 and 32 are for purposes to be described. Appropriate compressible sealing gaskets 34 and 36 respectively are provided at the lower and upper ends of the assembly shown particularly in FIG. 7, said gaskets respectively abutting the outermost ends of the supporting members 26 and 30. Said gaskets also are seated within the annular recesses 24 respectively provided in the upper and lower cap members 14 and 16. Said cap members also preferably are centrally threaded respectively to receive threaded plugs 38 which may be removed for the installing of inlet and discharge conduits or pipes when the filter system is to be installed within conduit means by which air or other gases to be filtered respectively are delivered to one end of the filter system and the filtered product is removed from the other end.

The most essential part of the filter system 10 comprises at least one and preferably a plurality of filter units 40 which are of specialized construction and several different embodiments are illustrated. Referring to FIG. 2, the filter unit 40 shown therein is formed from a seamless tube of textile fabric which preferably is manufactured from suitable synthetic resin which is substantially nonreactive with a wide range of contaminating materials normally found in air and gases of the type with which the filter system 10 is highly adaptable for use. Without restriction thereto, Nylon has been found to be very suitable for the formation of such textile material. The porosity of the material also is critical, at least with respect to the type of pulverulent material to be contained within the filter units 40. Various types of such pulverulent material may be used and, also without restriction thereto, diatomaceous earth and fuller's earth are suitable for such use.

Concerning the details of the filter units 40, the side walls 42 thereof are formed from said aforementioned seamless tubing, the diameter of which is preferably very slightly larger than the inner diameter of the sleeve 12, whereby when the units 40 are mounted therein and are reasonably compressed for firm support between the metal gauze members 28 and 32 of the lower and upper supporting members 26 and 30, said seamless side walls 42 will firmly and smoothly abut the inner surfaces of the sleeve 12 throughout substantially the entire circumferential area of the side walls 42. By such arrangement, no leakage, channeling or bypassing of air or other gases will occur between the side walls 42 of the filter units and the inner surface of the sleeve 12.

In the embodiment of the invention shown in particular in FIG. 2, bottom 44 preferably comprises a disc of textile material which is similar to that from which the seamless side wall tube 42 is formed. The perimeter of the disc is affixed by appropriate stitching to one end of the side wall tube 42. After the formation of such unit, it is filled with the desired pulverulent material 46 and, as shown in FIGS. 2 and 3, the upper end of the seamless sleeve which forms the side walls 42 is contracted and tightly tied to form the closure 48.

As indicated above, the synthetic resin from which the textile material of the side walls and bottom of the unit 40 are formed is thermoplastic, especially to insure that the closure 48 is absolutely tight so as to prevent any escape of the pulverent filtering material 46 therethrough, after the tying of the closure 48, a heated tool may be applied against the puckered and contracted closure, such as centrally thereof, to fuse said closure in a manner to eliminate any minute hole or passage which otherwise might exist in the closure as the result of only tying the same tightly.

In the embodiment of the invention shown in FIGS. 4 and 5, rather than form the top of the unit 40 by contracting the upper end of the side wall tube 42, another disc 50 which also is formed preferably from the same type of material as the side wall tube 42, is secured at its periphery by appropriate stitching to the upper end of the sleeve 42.

As best shown in the lower left corner of FIG. 4 and also in enlarged manner in FIG. 5, the lower end of sleeve 12 shown therein is turned inwardly. The periphery of the bottom disc 44 also is turned inwardly and the same is stitched together by the exemplary stitching represented by the cross line 52 in said figures. This is done in customary manner by stitching the two edges together and then turning the resulting product inside out. In addition, the stitching of the top disc 50 in the upper end of the side wall tube 42 may be similarly accomplished except for a short distance which, after filling of the filter unit enclosure thus formed is finally closed by suitable overcast stitching or the like.

A further feature of the present invention comprises the provision of a layer of highly absorbent material such as absorbent cotton 54 which is of appropriate thickness and is maintained in desired formation by enclosing the upper surface thereof with another disc of porous material such as gauze 56. Said gauze is in the form of a disc and the periphery thereof also is stitched to the adjacent edges of bottom disc 44 and the lower end of side wall tube 42, whereby the row of stitching 52 will secure all three of said elements together.

In the foregoing description, the filter system 10 as well as the filter units 40 have been referred to as having upper and lower ends and the like but it is to be understood that these terms are not restrictive and pertain only to the specific illustration in the drawing. While under most conditions of use, the filter system 10 will be mounted vertically, it is to be understood that under some specialized circumstances, it may be desirable to mount the same so as to extend in other directions than vertical. Thus, the terms upper and lower, top and bottom, etc., are used only in relation to the illustrations on the drawing for purposes of convenience.

With respect to the filter units 40 illustrated in FIGS. 4 and 5 in which the layer of highly absorbing material 54 is illustrated at one end, said end is preferred to be the inlet end of the filter unit and thus said ends of the units, when mounted within the sleeve 12, are disposed toward the inlet end of the filter system 10. Such inlet end normally is in the bottom cap member 16 and the threaded opening therein preferably also contains a small nipple 58 which is of suitable height to serve as a standpipe. The height of said nipple, however, is substantially less then the height of the lower supporting member 26 and the purpose of the same is to prevent any accumulation of drippings or drainage from the filter units 40 from running into the inlet conduit connected to the bottom cap member 16, for example.

In view of the disposition of the filter units 40 within the sleeve 12 in such manner that the highly absorbent layer 54 is nearest the inlet end of the filter system, such absorbent layer will rapidly absorb water vapor in particular and thus quickly initiate dehydration of the incoming stream of gas which is to be filtered. The pulverulent material 46 also is highly capable of absorbing not only water vapor but oil vapor as well and when, for example, the lowermost filter unit 40 shown in FIG. 1, for example, becomes substantially saturated, the economy of the system becomes evident from the fact that the lower saturated filter unit 40 may be removed while the remainder of the stack of such units may be moved downwardly and a new unit mounted at the upper end of said stack. This can be done conveniently by requiring only removal, for example, of the lower cap 16, followed by complete removal of all of the filter units 40, after which the new replacement unit is first inserted into the lower end of tube 12, followed by the partially used filter units 40, after which the cap 16 is replaced and the attachment of the wing nuts 22 completes the assembly operation.

Care should be exercised in mounting the filter units 40 within the tube 12 to insure the smooth disposition of the seamless tubular side walls 42 in order that the major contribution of the present invention will be effective, namely, the prevention of any leakage, channeling or bypassing of unfiltered gases between said seamless tubular side walls 42 of the units 40 and the inner surface of the sleeve 12. The preferred formation of the sleeve 12 from transparent material also greatly facilitates the checking of the condition of the filter system 10 since the degree of saturation of the individual units readily may be seen visually through said sleeve.

While the invention has been illustrated and described in its several preferred embodiments, it is to be understood that the invention is not to be limited to the precise details illustrated and described since the same may be carried out in other ways falling within the scope of the invention as illustrated and described.

I claim:

1. A filter system to absorb and separate water and oil vapors from gases comprising in combination, a cylindrical container, means at opposite ends of said container connectable respectively within a supply line to deliver inlet gases to one end of said container and discharge filtered gases from the opposite end of said container; at least one filter unit positioned within said container between the opposite ends thereof and comprising a seamless cylindrical sleeve formed from textile material and having a substantially uniform fine porosity throughout, pulverulent filter material enclosed within said sleeve, the opposite ends of said sleeve being closed by substantially the same kind of textile material as that of said sleeve and the diameter of said cylindrical sleeve being slightly larger than the interior diameter of said container; a layer of absorbing cotton-like material extending across the inner surface of one end of said filter unit and adapted to rapidly absorb water and oil vapors from gaseous material passed through said one end of said filter unit, and a sheet of porous material extending across the inner surface of said layer of absorbing material and secured at the edges thereof to said one end of said filter unit to position said layer of material operatively within said unit, porous means supported in the opposite ends of said container and positioned respectively to engage the opposite ends of said filter unit to support said filter unit within said container, and means in the opposite ends of said container engaging said porous means and exerting pressure thereon to expand said sleeve of said unit into close uninterrupted contact around the entire circumference thereof with the inner surface of said cylindrical container, whereby no channeling and bypassing of gases between the sleeve of said unit and the inner surface of said container can occur and filtering of all gases passing through said filter is assured.

2. The filter system according to claim 1 in which said one end of said filter unit comprises a porous disc secured at the periphery thereof to the end of said sleeve adjacent which said layer of cotton-like material is positioned, and said sheet of porous material adjacent the inner surface of said layer of cotton also being disc-like in shape and secured at its periphery to the adjacent end of said sleeve by the same stitching which secures said end disc of said filter unit to said sleeve.

3. The filter system according to claim 2 in which the opposite end of said unit comprises a porous disc secured at its periphery to said opposite end of said sleeve by stitching.

* * * * *